United States Patent [19]

Czaja

[11] Patent Number: 5,796,757
[45] Date of Patent: Aug. 18, 1998

US005796757A

[54] METHODS AND APPARATUS FOR PERFORMING RATE DETERMINATION WITH A VARIABLE RATE VITERBI DECODER

[75] Inventor: Stash Czaja, Cardiff, Calif.

[73] Assignee: Nokia Mobile Phones Ltd., Salo, Finland

[21] Appl. No.: 529,101

[22] Filed: Sep. 15, 1995

[51] Int. Cl.$^6$ .................................................. H03M 13/12
[52] U.S. Cl. ............................................ 371/46; 371/43.7
[58] Field of Search ............................... 371/43, 46, 43.7

[56] References Cited

U.S. PATENT DOCUMENTS

| | | | |
|---|---|---|---|
| 4,802,174 | 1/1989 | Hiraiwa et al. | 371/46 |
| 5,327,439 | 7/1994 | Estola et al. | 371/43 |
| 5,375,129 | 12/1994 | Cooper | 371/43 |
| 5,509,020 | 4/1996 | Iwakiri et al. | 371/43 |
| 5,566,206 | 10/1996 | Butler et al. | 375/225 |

FOREIGN PATENT DOCUMENTS

| | | |
|---|---|---|
| 0 446 745 | 9/1991 | European Pat. Off. . |
| 7046146 | 2/1996 | European Pat. Off. . |
| WO95/08888 | 3/1995 | WIPO . |

OTHER PUBLICATIONS

G.D. Forney, "The Viterbi Algorithm", Proc. IEEE, vol. 61, May 1973.

J.H. Lodge et al., "Separable Map Filters for Decoding of Product and Concatenated Codes", Proc. IEEE ICC '93.

J. Hagenauer et al., "A Viterbi Algorithm with Soft-Decision Outputs and its Application", Proc. IEEE Globecomm 1989.

N. Seshardi et al., "On Post Detection Symbol Reliability Generation", Proc. IEE ICC 1993, Geneva, May 1993.

T. Hashimoto, "A List-Type-Reduced-Constraint Generalization of the Viterbi Algorithm", IEEE Trans. Info. Theory, Nov. 1987.

Adaptive Maximum-Likelihood Receiver for Carrier-Modulated Data-Transmission Systems, G. Ungerboeck, IEEE Trans. Comm., May 1974, pp. 624–636.

"New VLSI Architechtures for Fast Soft-Decision Threshold Decoders", P. Lavoie, IEEE Trans. Comm., vol. 39, No. 2, Feb. 1991.

"Viterbi Algorithms with List and Soft Symbols Output: Extensions and Comparisons", C. Nill et al., IEEE, 1993, pp. 788–792.

G. Battail, "Weighting the Symbols Decoded by the Viterbi Algorithm", IEEE Int. Symp. Info. Theory, Oct. 1986, p. 141.

M. Biver et al., "Architectural Design and Realization of a Single-Chip Viterbi Decoder", Integration, the VLSI journal 8 (1989), pp. 3–16.

Cohen et al., "Multi-Rate Detection for the IS-95 CDMA Forward Traffic Channels", GLOBECOM '95, pp. 1789–1793, Dec. 1995.

*Primary Examiner*—Stephen M. Baker
*Attorney, Agent, or Firm*—Perman & Green, LLP

[57] ABSTRACT

A method in accordance with this invention includes the steps of (a) decoding a received signal and determining, for individual ones of n data rates, a value of a total cumulative metric associated with a most likely path through a decoder trellis; (b) comparing the value of the total cumulative metric to a plurality of total cumulative metric threshold values, individual ones of the plurality of total cumulative metric threshold values corresponding to an expected total cumulative metric for an individual one of the n data rates and being one of fixed or adaptively determined; and (c) identifying the received data rate based on the comparison. The step of determining a total cumulative metric includes the steps of (a) processing branch metrics to determine survivor metrics; (b) normalizing individual ones of the survivor metrics to form normalized survivor metrics; (c) accumulating the normalized survivor metrics to form cumulative metrics; (d) accumulating normalization values used to normalize each of the normalized survivor metrics; (e) at the end of decoding, outputting a cumulative metric that corresponds to a most likely path through the trellis; and (f) combining an accumulated normalization value with the outputted cumulative metric to form the total cumulative metric.

34 Claims, 11 Drawing Sheets

METHODS AND APPARATUS FOR PERFORMING RATE DETERMINATION WITH A VARIABLE RATE VITERBI DECODER

FIELD OF THE INVENTION

This invention relates generally to data communications and, in particular, to variable rate digital data communications techniques that employ a Viterbi decoder.

BACKGROUND OF THE INVENTION

A variable rate communications system of particular interest herein is a code division, multiple access (CDMA) technique as defined by the EIA Interim Standard IS-95. This CDMA system is based on a digital, wideband, spread-spectrum technology which transmits multiple, independent user signals across a single 1.25 MHz segment of radio spectrum. In CDMA, each user signal includes a different orthogonal code and a pseudo-random binary sequence that modulates a carrier, spreading the spectrum of the waveform, and thus allowing a large number of user signals to share the same frequency spectrum. The user signals are separated in the receiver with a correlator which allows only the signal energy from the selected orthogonal code to be de-spread. The other users signals, whose codes do not match, are not de-spread and, as such, contribute only to noise and thus represent a self-interference generated by the system. The SNR of the system is determined by the ratio of desired signal power to the sum of the power of all interfering signals, enhanced by the system processing gain or the spread bandwidth to the baseband data rate.

The CDMA system as defined in IS-95 uses a CELP-based variable rate voice coding (vocoder) algorithm in which the data rate changes dynamically on a frame by frame basis as a function of the speech pattern (voice activity). The Traffic Channel frames can be transmitted at full, ½, ¼ or ⅛ rate (9600, 4800, 2400 and 1200 bps, respectively). With each lower data rate, the transmitted power ($E_s$) is lowered proportionally, thus enabling an increase in the number of user signals in the channel. Since the data rate is not known a priori to the receiver, the conventional Viterbi decoder performs sequential decoding of all possible rates and then determines the rate of the current data frame. In addition to decoding the block encoded, variable rate Traffic Channel, the Viterbi decoder performs decoding of a continuously encoded Sync Channel with a fixed rate of 1200 bps, and Paging Channel with a rate of 9600 or 4800 bps. A 20 ms Traffic Channel frame thus contains 192, 96, 48 and 24 data bits for rates 1, ½, ¼ and ⅛, respectively. Prior to convolutional encoding, the data bits for rate 1 and rate ½ are encoded with a CRC polynomial and the 12 and 8 bit (respectively) CRC fields are appended to the data bits. However, the ¼ and ⅛ rates are not protected by the CRC. Each Traffic Channel frame is terminated with eight tail bits, which forces the Viterbi decoder to a known state. The 80 ms Sync Channel is continuously encoded and contains three 26.6 ms. frames, each containing 32 data bits.

If an error occurs in the associated CRC field, the received information is of little value in the rate determination process. Additionally, as specified in the IS-95 Interim Standard the data rate Set 1 protects only the two highest data rates (9600 bps and 4800 bps) with the CRC polynomial. The two lower data rates (2400 bps and 1200 bps) are not protected by the CRC at all. As such, the rate determination must be performed using criteria other than the CRC.

There are two additional criteria which may be used in performing the rate determination: SER (Symbol Error Rate), and the size of the Viterbi-determined Cumulative Metric for the ML (Most Likely) path. However, in any practical system these two parameters are very unreliable, since the first parameter varies largely as a function of SNR (Signal-to-Noise Ratio), while the second parameter is typically distorted by a scaling of the ML path Cumulative Metrics during the decoding process.

In greater detail, in a wireless communication system such as IS-95, the traffic channel supports variable data rate operation at 9600, 4800, 2400, 1200 bps for the Set 1 of rates, and 14400, 7200, 3600 and 1800 bps for the Set 2 of rates. In the variable rate system, the transmitter may change the rate from frame to frame depending on the overall channel conditions. Also, in a spread spectrum system, such as that specified by IS-95, the system maintains a constant channel rate of 19.2 kHz regardless of the actual data rate transmission. This is achieved by repeating the symbols by two, four or eight times (for the respective lower date rates).

After demodulation of the signal the receiver must determine the data rate of the current frame before the frame is sent to a vocoder or a data file. This is conventionally done by the Viterbi decoder, which performs the consecutive decoding of all possible data rates and then determines the transmitted rate. In this process, the Viterbi decoder uses the CRC polynomial as well as the re-encoded SER and possibly the decoder Cumulative Metrics.

As was previously indicated, for the Set 1 of IS-95 data rates only the two higher data rates are protected by the CRC polynomial. As such, the determination of the 2400 and 1200 rates can be accomplished using the SER. It is well known that the error-detection capability of the CRC bits is largely determined by the degree r of $G_{(x)}$, or the number of CRC bits. In particular, any single-burst error of length r or less is detected. The number of undetected single-burst errors of length r+1 is $\frac{1}{2}^{r-1}$, and that of the length greater than r+1 is $\frac{1}{2}^{r}$.

Taking into consideration the reliability of CRC, it is evident that it cannot be used independently as the only indicator of the transmitted data rate. As such an additional parameter, namely the SER, is typically considered. In this case the symbols are re-encoded, are compared with the received symbols, and the SER is calculated. The SER so calculated is then compared to a predetermined (for each rate) SER and is thus considered during the rate determination. However, since the SER can vary significantly (approximately 1% to 10% over the expected $E_b/N_o$), as a function of the SNR and the type of fading, this criterion is extremely unreliable. By example, a 2% SER at 2400 bps is the same as a 4% SER at 1200 bps, while in each of these cases the decoder is expected to decode all bits properly.

A last criterion that may be used in the rate determination process is the size of the Viterbi decoder Cumulative Metrics. However, in any practical implementation of the Viterbi algorithm for IS-95, the Cumulative Metrics must be normalized to allow for an efficient implementation. In this case, the comparison of the normalized Cumulative Metrics between the various data rates is very difficult and, as such, the confidence level associated with this parameter during the rate determination process is low.

The use of the Viterbi algorithm for decoding digital data in a communication channel is well described in the patent and general literature. Reference may be had, by example, to the Viterbi decoders described in the commonly-assigned U.S. Pat. No. 5,327,439, issued Jul. 5, 1994, (K. Estola et al.)

and in European Patent Application 0446745A2 (18.09.91) by H. Jokinen et al. Reference can also be had to the following publications for describing various aspects of the use and operation of the Viterbi algorithm: G. D. Forney, "The Viterbi Algorithm", Proc. IEEE, Vol. 61, May 1973; J. H. Lodge et al. "Separable MAP filters for Decoding of Product and Concatenated Codes", Proc. IEEE ICC '93; J. Hagenauer, et al., "A Viterbi Algorithm with Soft-Decision Outputs and Its Application", Proc. IEEE Globecomm 1989; N. Seshardi, et al. "On Post Detection Symbol Reliability Generation, Proc. IEE ICC 1993, Geneva, May 1993; and T. Hashimoto, "A List-Type-Reduced-Constraint Generalization of the Viterbi Algorithm", IEEE Trans. Info. Theory, November 1987.

Reference can also be had to U.S. Pat. No. 5,375,129, "Maximum Likelihood Sequence Detector", by A. Cooper for a description of a Maximum Likelihood (ML) detector that uses the Viterbi algorithm for estimating a sequence of data bits received over a communication channel.

OBJECTS OF THE INVENTION

It is a first object of this invention to provide a method and circuit that accumulates a value indicating the total scaling of at least the Cumulative Metric ML path, thus allowing for the reconstruction of the dynamics of the transmitted signal and the use of the resulting reconstructed Cumulative Metric for rate determination.

It is a second object of this invention to overcome the problem of ambiguity (i.e., the lack of precision and overlapping decision boundaries while using the CRC and SER), in a rate determination process with a variable rate Viterbi decoder.

It is a further object of this invention to provide circuits and methods for the determination of reliable rate information with a minimum memory cost.

SUMMARY OF THE INVENTION

The foregoing and other problems are overcome and the objects of the invention are realized by methods and apparatus that decode data received from a communications channel, that accumulate the normalization value of Cumulative Metrics at each step of the decoding process, that use the accumulated normalization value to reconstruct a Total Cumulative Metric for at least the ML path, and that then compare the Total Cumulative Metric to a predefined or fixed (for each data rate) threshold, or to an adaptively set threshold, so as to identify a rate at which the data was received from the communications channel.

In accordance with a method of this invention, and apparatus for performing the method, there is provided at least one technique for determining a data rate of a received encoded signal. A method in accordance with this invention includes the steps of (a) decoding the received signal and determining, for individual ones of n data rates, a value of a total cumulative metric associated with a most likely path through a decoder trellis; (b) comparing the value of the total cumulative metric to a plurality of total cumulative metric threshold values, individual ones of the plurality of total cumulative metric threshold values corresponding to an expected total cumulative metric for an individual one of the n data rates and being one of fixed or adaptively determined; and (c) identifying the received data rate based on the comparison.

The step of decoding includes a step of determining branch metrics of received symbols, which in turn includes an initial step of scaling in one of a linear or a non-linear manner the received data in accordance with individual ones of the n data rates.

In accordance with an aspect of this invention the step of determining a total cumulative metric includes the steps of (a) processing the branch metrics to determine survivor metrics; (b) normalizing individual ones of the survivor metrics to form normalized survivor metrics; (c) accumulating the normalized survivor metrics to form cumulative metrics; (d) accumulating normalization values used to normalize each of the normalized survivor metrics; (e) at the end of decoding, outputting a cumulative metric that corresponds to a most likely path through the trellis; and (f) combining an accumulated normalization value with the outputted cumulative metric to form the total cumulative metric.

The data is received during a given frame of data at one of a highest rate and at least one lower rate. In accordance with a further aspect of this invention the step of comparing includes the steps of (a) performing an initial step of determining a value of an average cumulative metric for data received at the highest rate; (b) calculating from the determined value a cumulative metric threshold value for each of the highest rate and the at least one lower rate; and for each subsequent frame that is determined to be received at the highest rate, (c) revising the value of the average cumulative metric; and (d) calculating from the revised value a revised cumulative metric threshold value for each of the highest rate and the at least one lower rate.

It is also within the scope of this invention to perform the rate determination using only the Cumulative Metric normalization value. In this case fixed or adaptive thresholds are determined based on an accumulated State 0 normalized value, and this value is used when comparing the result of decoding a frame to the threshold values.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

As was described previously, in most multi-rate systems, and particularly the IS-95 system, after the convolutional encoding operation the channel data rate (symbol rate) is maintained at a constant rate (e.g., 19.2 kHz) by repeating the symbols by two, four or eight times (for the respective lower date rates).

During the decoding process the Viterbi decoder attempts to decode the incoming data frame for all possible rates to determine the correct rate. During the Viterbi decoder Branch Metrics calculation, and for all data rates except the highest, before the decoder adds/subtracts the encoded symbols it adds the two, four, or eight times repeated symbols in order to recover the loss of signal power when transmitting at the lower data rates. The inventor has realized that this addition is coherent only for those symbols decoded with the same data rate as the rate of transmission. For all other data rates, the accumulated dynamic range of the received symbols is lowered by incoherent addition, thus lowering the Cumulative Metrics size by approximately half for all data rates except the correct rate.

In accordance with the teaching of this invention, by accumulating the normalization value of the Cumulative Metrics at each step of the decoding process, using the accumulated normalization value to reconstruct a Total Cumulative Metric for at least the ML path, and then comparing this value to a predefined or fixed (for each data rate) threshold, or to an adaptively set threshold, the performance of a variable rate receiver is improved.

Figure 1:
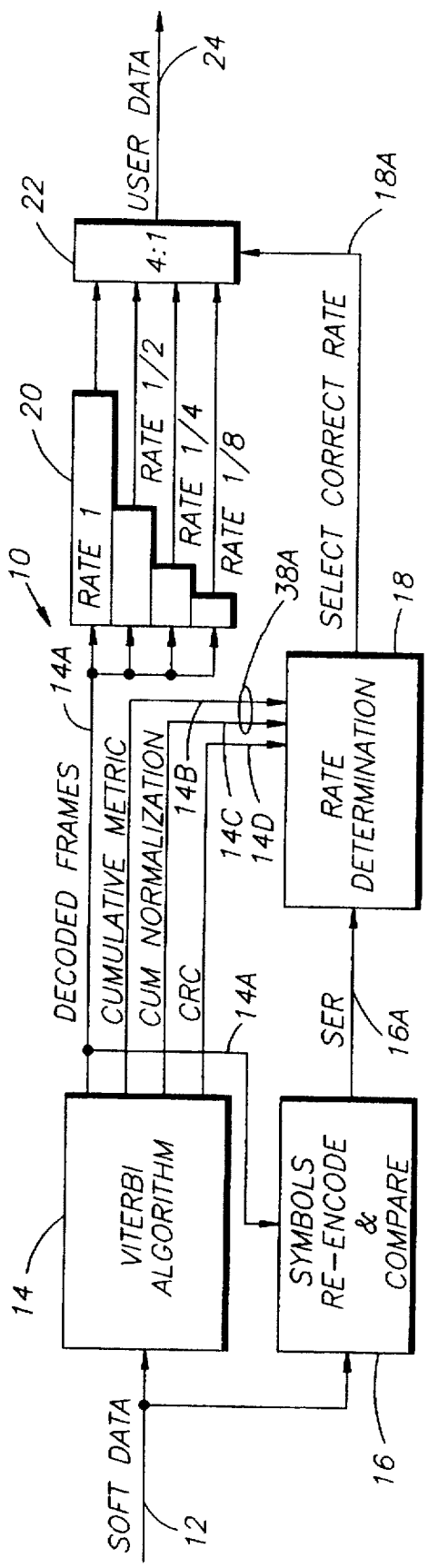
FIG. 1 is block diagram of circuitry for practicing this invention.
Figure 11:
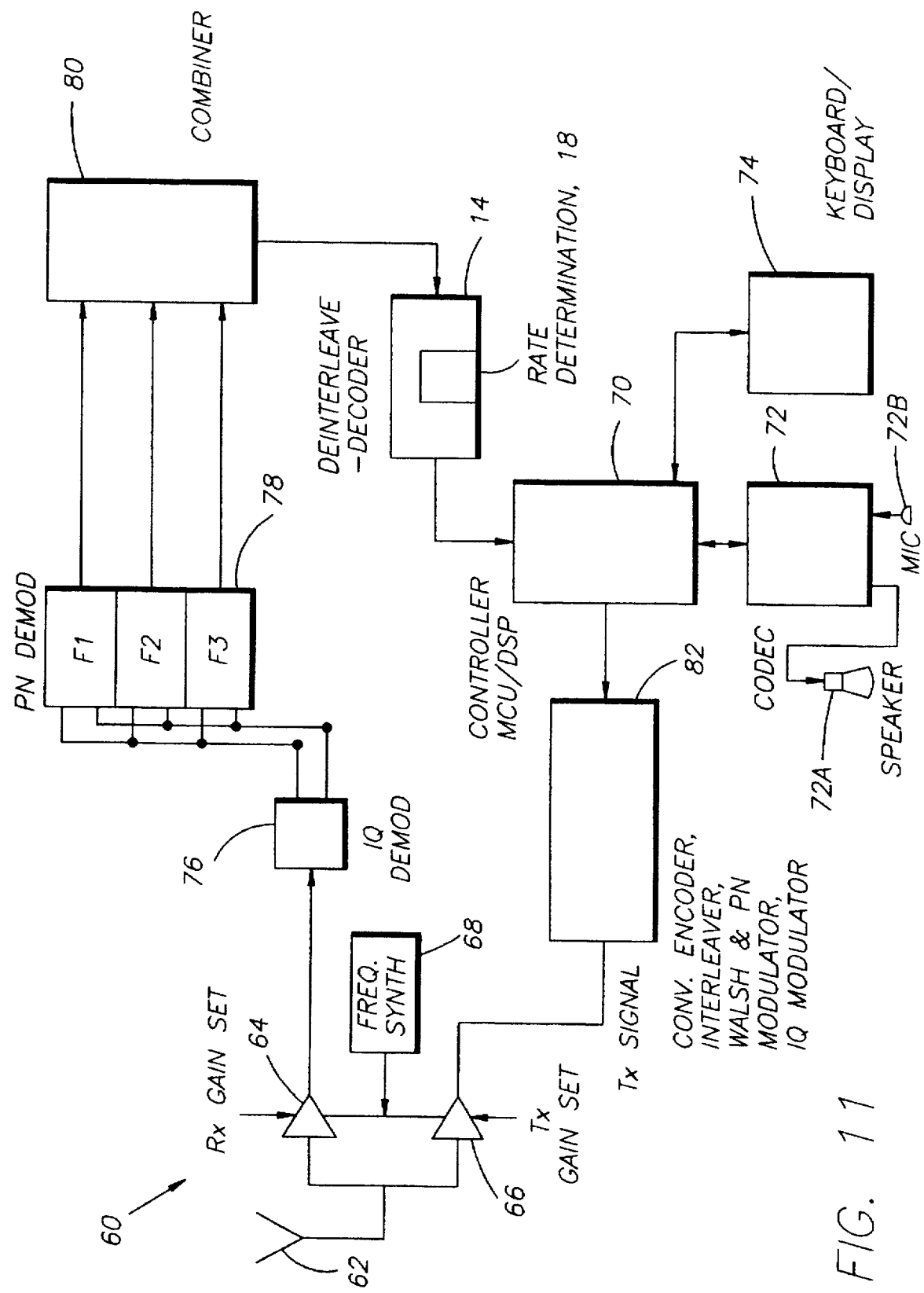
FIG. 11 is a block diagram of a radiotelephone that incorporates the teachings of this invention.

FIG. 1 illustrates a portion of a variable rate receiver 10 that is constructed in accordance with this invention. The receiver 10 may form a portion of a radiotelephone 60 as shown in FIG. 11, such as one compatible with the IS-95 Code Division Multiple Access (CDMA) specification, although the teaching of this invention is not limited to only this one application and technical environment. Other portions of the radiotelephone 60, shown in FIG. 11 and described below, include an antenna, suitable RF receiving and down-conversion circuits, a demodulator, and an analog to digital (A/D) converter for converting received data to a digital format. For a CDMA receiver it is understood that the receiver includes a suitable signal de-spreader or demodulator, such as a RAKE demodulator having one or more fingers (also shown in FIG. 11).

Frames of soft data 12 that are received from the communications channel are applied to an input of a Viterbi decoder block 14 and to an input of a Symbol Re-encode and Compare (SRC) block 16. The Viterbi decoder block 14 operates to provide a decoded frames output 14a to a second input of the SRC 16 and also to an output register block 20. The output register block 20 includes four registers of different lengths, corresponding to the four rates (R1, R½, R¼, R⅛) of a given rate Set. The Viterbi decoder block 14 also outputs to a Rate Determination block 18 a Cumulative Metric signal 14b, a Cumulative Metric Normalization signal 14c, and (optionally) a CRC signal 14d. A fourth (optional) input to the Rate Determination block 18 is the SER 16a that is output from the SRC 16. The Rate Determination block 18 processes these various inputs in accordance with the teaching of this invention and outputs a Select Correct Rate signal 18a to a 4:1 multiplexer 22 which selects a correct one of the output registers 20 as a source of user data 24 for a given received frame.

In greater detail, the reliability of Optimality Determination criteria, used to choose a decision rule, is based on the principle of minimizing the probability of an erroneous rate decision by evaluating the conditional probability of random variables A and B according to Baye's theorem:

$$P(A|B)P(B)=P(B|A)P(A)=P(A,B)$$

with $$P(A|B) = \frac{P(B|A)P(A)}{P(B)}$$

Using a priori probabilities of the transmitted data rate, the likelihood is measured that a received frame $t_{(j)}$ belongs to the rate $r_{(i)}$ from the conditional probability density function $P(t_{(j)|r(i)})$. Next is determined the a posteriori probability $P(r_{(i)}|t_{(j)})$, which is used as the optimality criteria to determine decision thresholds.

From these probabilities various criteria are used to determine thresholds based on the parameters obtained from the Viterbi decoder 14 during the decoding process. These thresholds are used by the Rate Determination block 18 to determine the data rate of the current frame.

The CRC polynomial 14d that is output from the Viterbi decoder 14 is 12 bits in length for Rate 1, and protects 172 bits of data. The CRC polynomial 14d is eight bits in length for Rate ½, and protects 80 bits of data. It is assumed that when decoding with the incorrect data rate (Tx rate is not equal to the decoder rate), the channel code-words, when combined into branch metric symbols, resemble noise due to the symbol repetition. Thus, for the Rate 1 the probability of the CRC polynomial 14d to be erroneously decoded is approximately $2.44^{-4}$. For the Rate ½ this probability is only $1/256$, and is thus of significantly lesser value. The CRC polynomial 14d is not available at all for the two lowest rates.

The SER signal 16a is only reliable in a high SNR channel, and thus also has limited value.

The size of the Cumulative Metrics of the Most Likely (ML) path is also a function of the SNR. However, when taking into consideration certain properties of the IS-95 system, such as changes in transmitted power proportional to the transmitted rate, symbol repetition rate, and the size of the data fields for each rate, a large variance in the size of the Cumulative Metrics can be expected. The general principles governing this parameter are described below.

In any practical implementations of the Viterbi algorithm, it is necessary to normalize the Cumulative Metrics in order to avoid clipping. However, the normalization process typically destroys the absolute size of the Cumulative Metrics.

To overcome this problem the Viterbi decoder 14 is operated so as to accumulate the normalization value at each transition through the trellis, thus allowing for the reconstruction of the absolute size of the Cumulative Metric.

Before further describing the particulars of the Cumulative Metrics a discussion is first made of the rationale for scaling the soft data. In general, the soft data 12 at the input to the Viterbi decoder 14 is scaled depending on the data rate. As was previously described, the symbols are repeated at the lower rates in order to maintain a constant channel data rate. The symbols of the lower data rates are repeated in the inverse proportion to the rate, while at the same time the transmitted energy $E_s$ is lowered by 3 dB. This loss of transmitted energy is recovered at the Viterbi decoder 14 by accumulation of the soft data into a one channel code-word. After the accumulation, the code-word symbols are scaled to the word width of the Viterbi decoder 14. In order to avoid clipping of the full rate soft data, the gain of an input A/D convertor (not shown in FIG. 1) is reduced. When mapping the dynamic range of the full rate signal and ⅛ rate signal into 4-bit soft data, a non-linear scaling, such as is shown in FIG. 2B, is preferably employed. As such, the soft data for the full rate and the half rate are not scaled at all, the quarter rate soft data is scaled by two, and the eighth rate soft data is scaled by four. If the scaling were instead proportional to the repetition rate, the scaling would be 1, 2, 4, and 8 for full, half, quarter and eighth rate soft data, respectively, as is shown in the alternative embodiment of FIG. 2A.

At the completion of decoding, the size of the Cumulative Metrics is normalized for each data rate. This is accomplished by dividing by two the size of the Cumulative Metrics for the half, quarter and eighth rates.

Figure 2A:
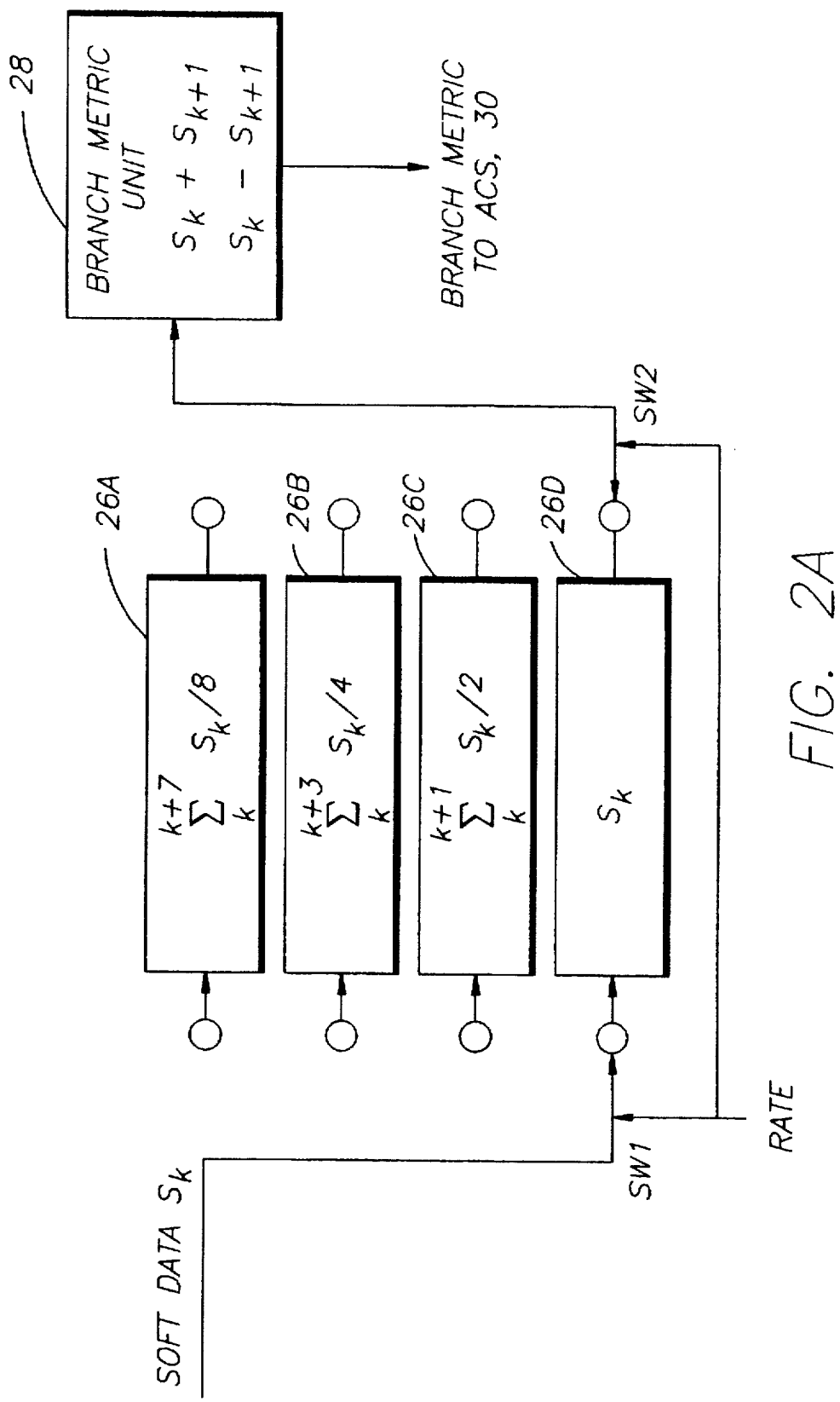
FIG. 2A is a block diagram of a first embodiment of circuitry for performing branch metric channel symbol accumulation and scaling.
Figure 2B:
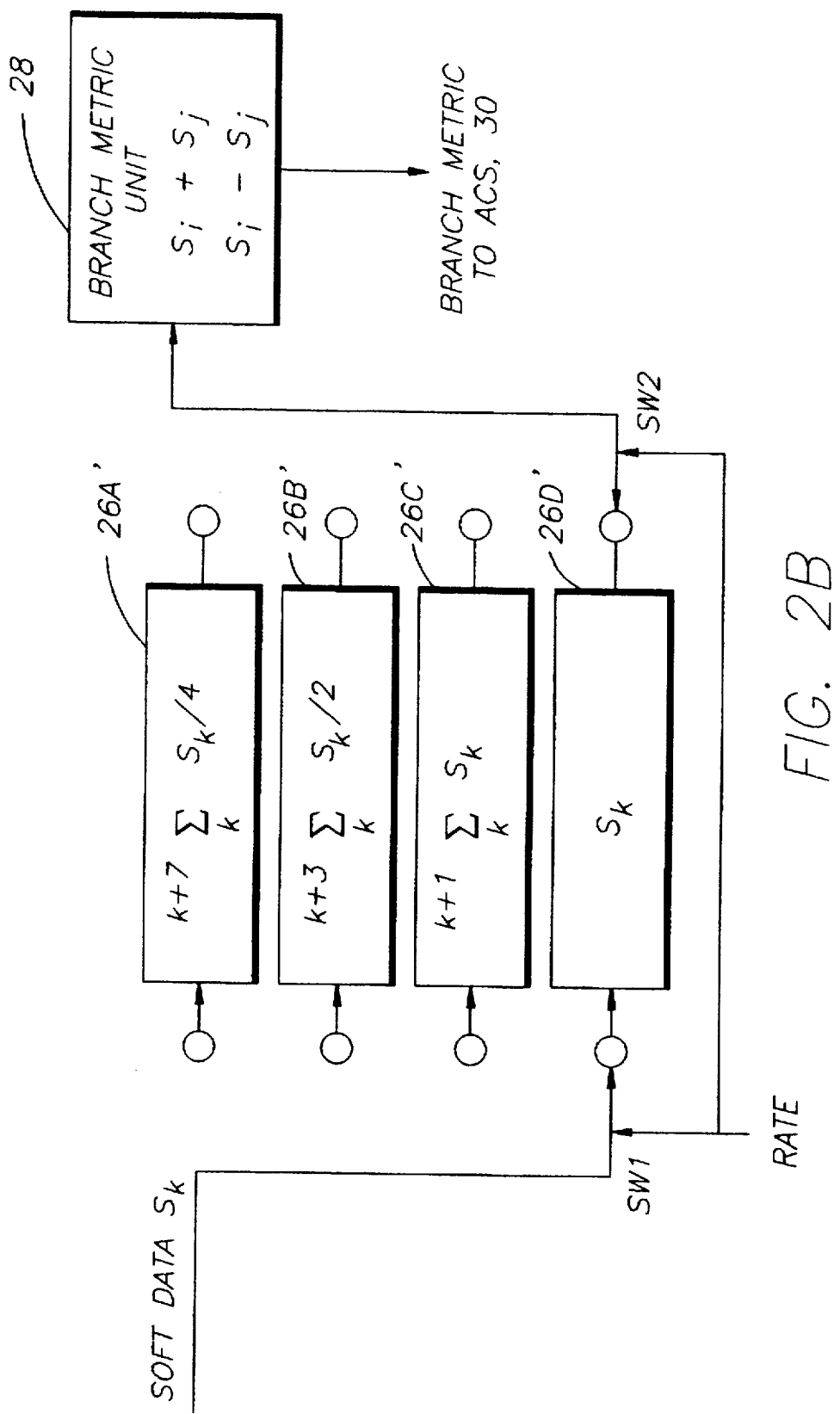
FIG. 2B is a block diagram of a second embodiment of circuitry for performing branch metric channel symbol accumulation and scaling.

The block diagram of FIG. 2A illustrates a first embodiment of circuitry 26a–26d for performing soft data scaling before branch metrics calculations occur in a branch metrics unit 28. Switches SW1 and SW2 are controlled by a rate signal so as to couple the inputs of the scaling blocks 26a–26d to the soft data 12, and to couple the outputs of the scaling blocks to the branch metric unit 28, respectively. In the embodiment of FIG. 2A, the scaling is essentially linear. However, and as was indicated above, it may be preferred to employ the non-linear scaling circuitry 26a'–26d' of FIG. 2B. The output of the branch metrics unit 28 is supplied to an Add, Compare, Select (ACS) unit 30 (FIG. 3).

Figure 7:
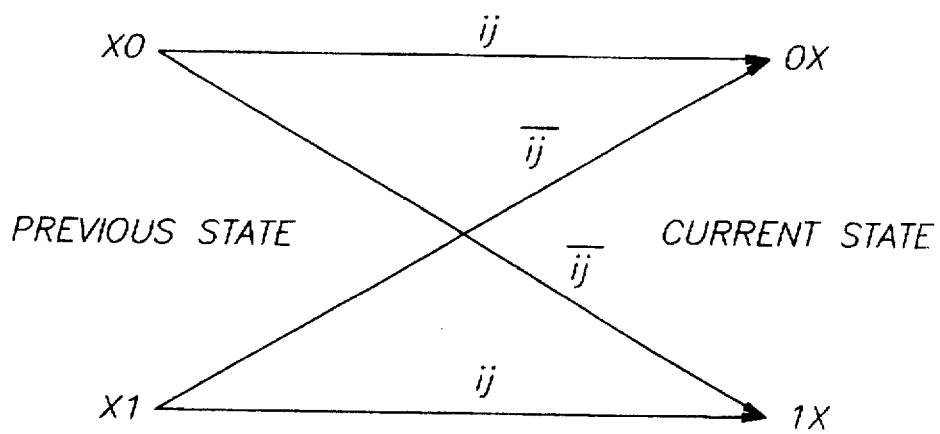
FIG. 7 illustrates one suitable branch metric decision butterfly for the ACS block of FIG. 3.

The branch metric is defined herein as the square of the difference between a received sample value and an optimum value. There are four branch metrics to compute, two for each state. The squared term may be eliminated by adding and subtracting the received symbols s0 and s1 as follows: i+j, i–j. Since the first and last term of the generation polynomial are 1, the hypothesis (ij) for the transmitted symbols of the two paths entering and leaving a state are complements. The proper branch metric for each state transition is selected according to the current state. One suitable decision butterfly is generally shown within the ACS block 30 of FIG. 3, and is shown more particularly in FIG. 7.

Figure 10:
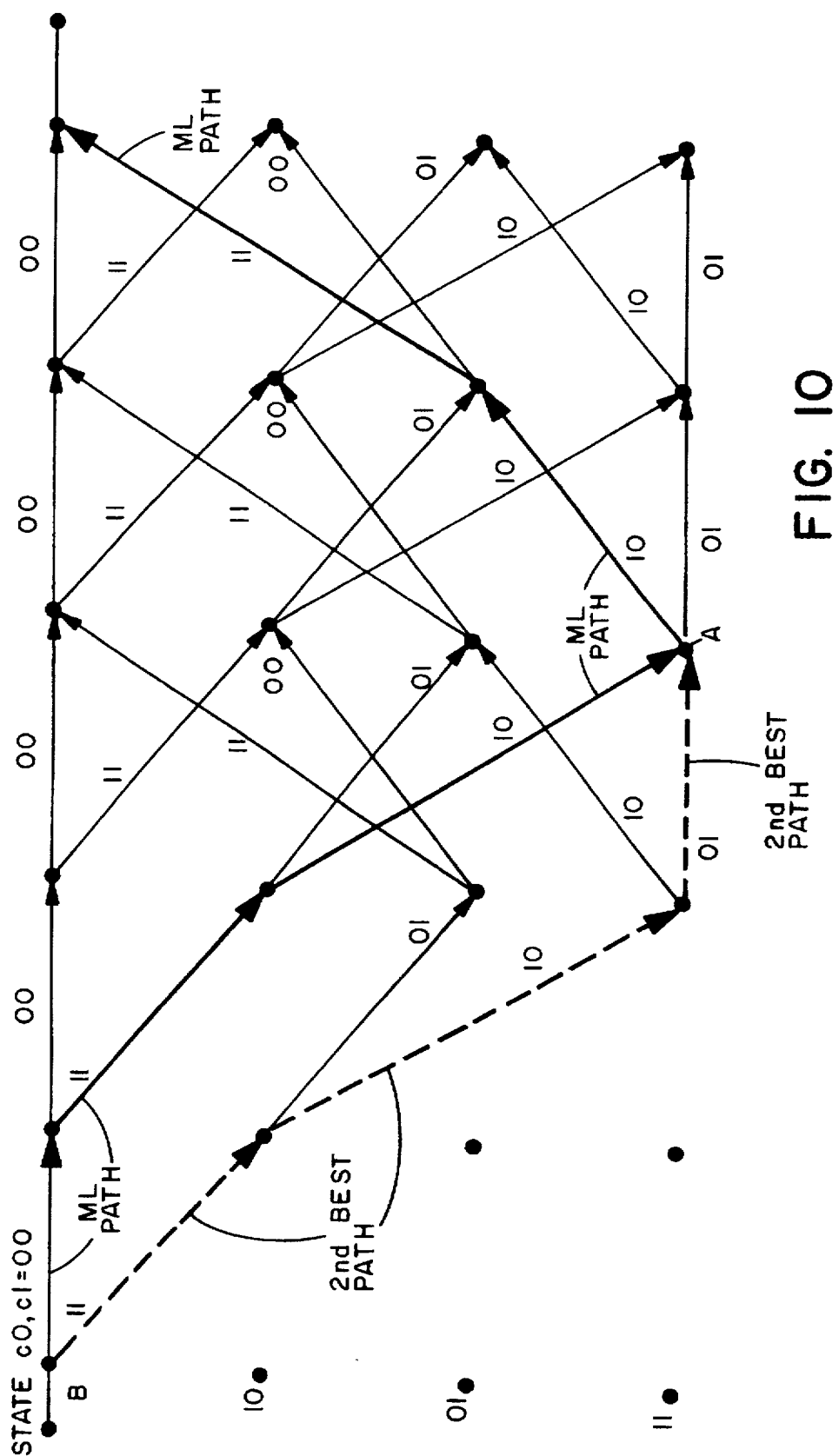
FIG. 10 illustrates a trellis diagram that is useful in understanding the decoding process.

For a given code constraint length k, there will be $2^{k-1}$ possible data bit patterns (states) that need to be evaluated as part of the ML global path. This is a trellis-type of operation, of a type shown generally in FIG. 10. FIG. 10 illustrates a portion of a simplified trellis and shows a Maximum Likely (ML) path and a second path, referred to as a second best Likely path, or simply as the second best path. The trellis may be organized as 256 states by 192 transitions, for a vocoded speech frame comprised of 192 bits (172 bits of speech, 12 bits of appended CRC syndrome, and 8 bits of appended zeros, also referred to as tail bits). For each state, the relative probability of the path passing through this state is calculated by adding the branch metric for this transition to the Cumulative (accumulated) state Metric of each of the two possible states. The largest (or smallest in some implementations) Cumulative state Metric is selected, and the new accumulated (Cumulative) transition value for this state is stored into a Cumulative Metrics memory (block 36 in FIG. 3). Stated differently, the metric of the selected transition becomes the new state metric. In this manner the algorithm precedes through all transitions, 192 times for the rate 1, 96 times for rate 2, etc. for the Set 1 of data rates, and 288, 144, 72, and 36 times for the Set 2 of data rates.

Figure 3:
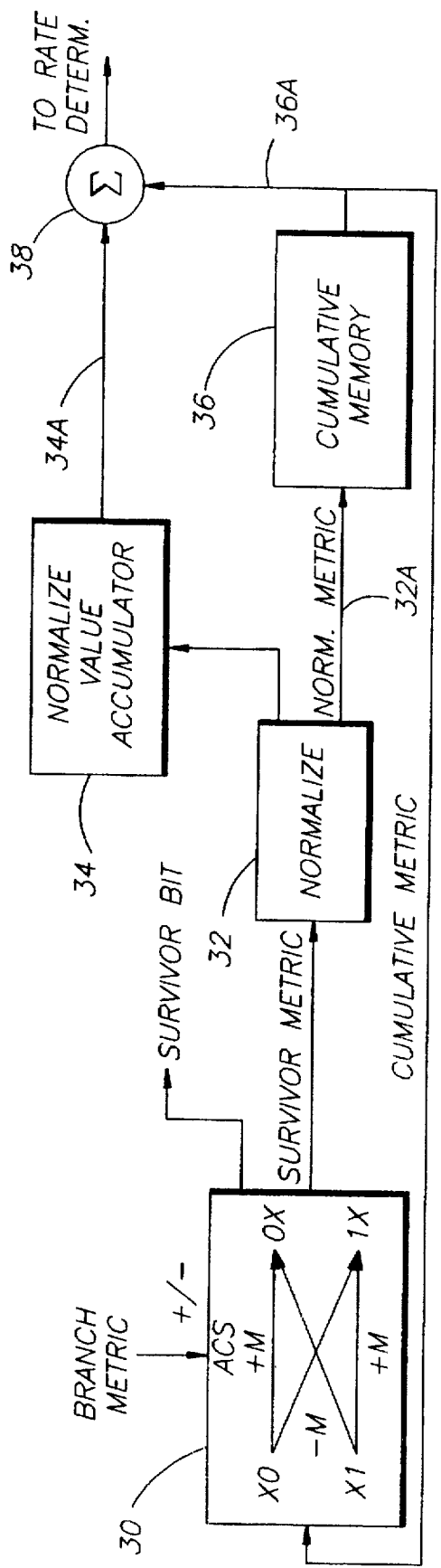
FIG. 3 is a block diagram of circuitry for performing Cumulative Metric normalization accumulation.

At the output of the ACS block 30 in FIG. 3 is a normalize block 32, which normalizes the survivor metric 30a before storing same as a normalized metric 32a into the cumulative metric memory 36. In practice, and referring also to FIG. 10, the State 0 value is determined for a given one of the trellis transitions, and this value is then subtracted from the other states determined for that transition, thus normalizing to the State 0 value the States 1 to n (for example, states 01, 10, and 11 of FIG. 10) of each transition. The State 0 values so determined at each transition are accumulated in a normalize value accumulator 34. The accumulated normalization value 34a can be summed with the Cumulative Metric 36a in block 38 before being applied to the rate determination block 18 (FIG. 1), or the accumulated normalization value 34a can be applied separately as the Cumulative Metric normalization signal 14c, as is shown in FIG. 1. In this case the Cumulative Metric 36a is then also applied as the separate Cumulative Metric signal 14b, and the two are combined in the rate determination block 18.

In a perfectly linear system, the size of the Cumulative Metrics for a full rate frame is $2\sqrt{2}$ greater than that of the half rate frame for the same $E_b/N_o$. This is because the half rate $I_c$ energy is lowered by 3 dB before transmission, while the symbols are repeated twice ($\sqrt{2}$ in the amplitude domain). Also, the half rate frame will halve the number of trellis transitions. This same relationship exists for the lower data rates.

For the case where the frame is decoded at the incorrect rate, the received soft data is accumulated incoherently into the half rate code-words. For example, and referring again to FIGS. 2A and 2B, when the Viterbi decoder 14 performs the decoding of a frame at 9600 bps, it performs the branch metric calculation on symbols $s_i$ and $s_j$. However, when the same frame is decoded at the 4800 bps rate, the Viterbi decoder 14 assumes that the data symbol $s_i$ was repeated twice. As a result, it accumulates $s_i+s_j$ into $S_i$ and $s_{i2}+s_{j2}$ into $S_j$. In other words, the decoder accumulates two channel symbols for rate ½, four channel symbols for rate ¼, and eight channel symbols for rate ⅛ before calculating the branch metric. As a result, the soft data is added coherently only if the received data rate is equal to the currently decoded data rate.

The effect of coherent and non-coherent addition of the soft data as a function of the transmitted and the decoded rate is further analyzed below, while taking into the consideration the Viterbi decoder 14 implementation features (soft data scaling and metrics normalization).

If the branch metric is referred to as being normalized to the full rate branch metric, then the following relationships can be defined between the relative size of the Cumulative Metrics, as a function of the data rate, as follows:

Half_Rate/Full_Rate=1/c1;

Quarter_Rate/Full_Rate=1/c2; and

Eighth_Rate/Full_Rate=1/c3;

where c1, c2, and c3 are constants having suitable values of, by example, approximately 2.8, 7.8, and 22, respectively.

An example of the non-coherent addition of full rate soft data that is decoded at half rate is as follows:

$$CUM_{half} = \sum_{1}^{96} \sqrt{2} \ |(0.5S_{i1} + 0.5S_{j1}) \pm (0.5S_{i2} + 0.5S_{j2})| = \sum_{1}^{96} 1.41BM$$

An example of the non-coherent addition of half rate soft data that is decoded at quarter rate is as follows:

$$CUM_{quart} =$$

$$\sum_{1}^{48} \sqrt{2} \ |(S_{i1} + S_{i1}) \pm (0.5S_{i2} + 0.5S_{j2})| = \frac{1}{2} \sum_{1}^{48} \sqrt{2} \ X \ 1.5BM$$

From the above, and without significant loss of precision, it can be generalized that the Cumulative Metrics double in size (as an effect of non-coherent addition) from the expected size when the decoded rate is one rate higher than the transmitted rate. Additionally, the Cumulative Metrics are scaled by factor of $1/\sqrt{2}$ from the expected value. Also, it should be noted that the dynamic range of the Cumulative Metrics depends primarily on the rate matching (transmitted vs. decoded), and less on the SNR.

Figure 8:
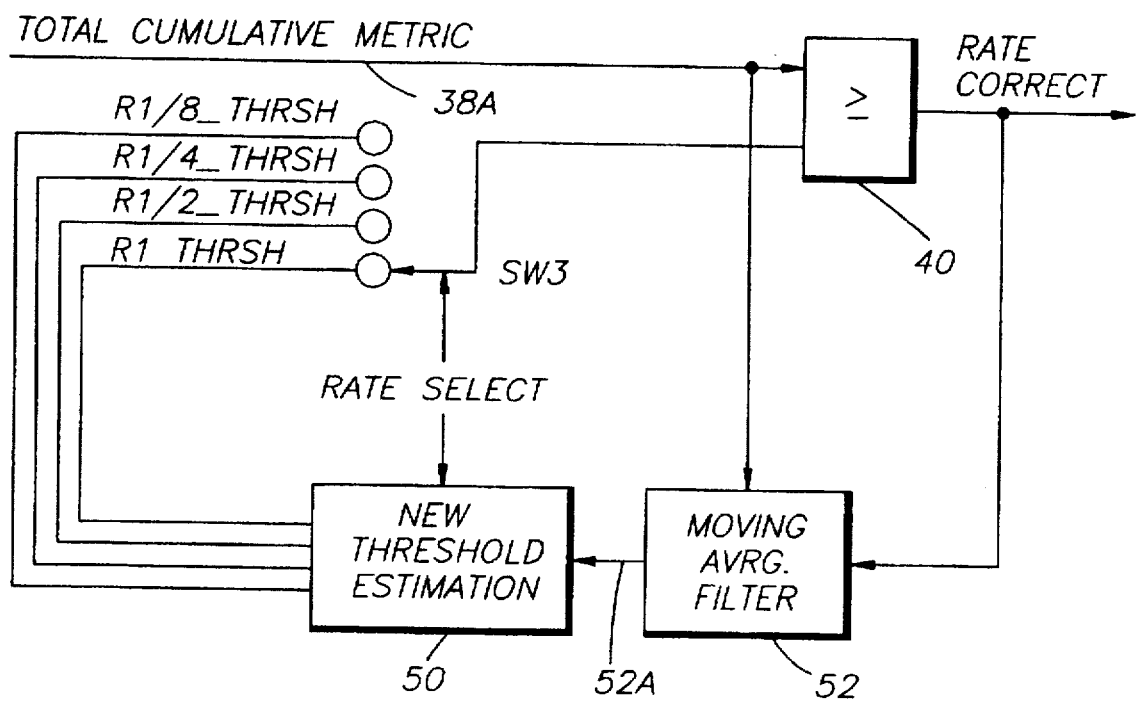
FIG. 8 is block diagram of s second embodiment of circuitry for selecting a rate in accordance with the total Cumulative Metric and adaptive rate thresholds.

Two rate determination methods are now described. The first is referred to herein as a fixed decision thresholds rate determination (FDTRD) method (FIG. 4, 5, and 6), while the second is referred to herein as an adaptive decision thresholds rate determination (ADTRD) method (FIGS. 8 and 9).

The FDTRD method

The FDTRD method of this invention takes advantage of the incoherent addition of the repeated channel symbols for all data rates except the correct one, and also the knowledge of the Total Cumulative Metric for the ML path of the Viterbi decoder 14, to define fixed rate determination thresholds.

In the spread spectrum system of most interest to the teaching of this invention, the de-spreading and demodulation of the signal is typically performed by a Rake receiver (see FIG. 11). The Rake receiver essentially performs space diversity combining which, in combination with an AGC (Automatic Gain Control) function that minimizes the effect of signal fading, provides a relatively constant signal amplitude during a frame period.

As such, the dynamic range of the Branch Metric is primarily a function of the coherent addition of the channel symbols. For example, when the Viterbi decoder 14 performs the decoding of a frame at 9600 bps, it performs the Branch Metric calculation on symbols s1 and s2. However, when the frame is decoded at 4800 bps rate, the Viterbi decoder 14 assumes that the data symbol s1 was repeated twice, and it thus accumulates s1+s2 into S1 and s2+s3 into S2, as was described previously. In other words, and as is illustrated in FIG. 2A, the Viterbi decoder 14 accumulates two channel symbols for rate ½, four channel symbols for rate ¼, and eight channel symbols for rate ⅛ before calculating the Branch Metric. After this accumulation, the result is normalized to the highest data rate (e.g., divided 1, 2, 4, or 8 for rate 1, ½, ¼ and ⅛ respectively). This is essentially a linear scaling process. However, the addition is coherent only if the transferred data rate is the same as the currently decoded data rate. The effect of the incoherent symbol addition on the size of the Cumulative Metric is $1/\sqrt{2}$ of the rate's nominal size. As such, the dynamic range of the Cumulative Metric depends primarily on the rate matching. The fixed thresholds for all data rates can be defined empirically from simulations and/or from actual measurements taken under a variety of reception conditions.

The teaching of this invention takes advantage of this property of the Cumulative Metric by monitoring the normalization rate of the Cumulative Metrics at each step of the decoding process. The normalization value of the Cumulative Metric is accumulated by the Viterbi decoder 14 into the Normalize Value Accumulator 34 of FIG. 3, which is added at block 38 to the value to the Cumulative Metric of ML path at the end of the decoding process. In effect, the Viterbi decoder 14 is enabled to re-create the size of Total Cumulative Metric for the ML path, as well as for all other paths. The size of the Cumulative Metric for the ML path can be used to determine the decoding quality factor.

Figure 4:
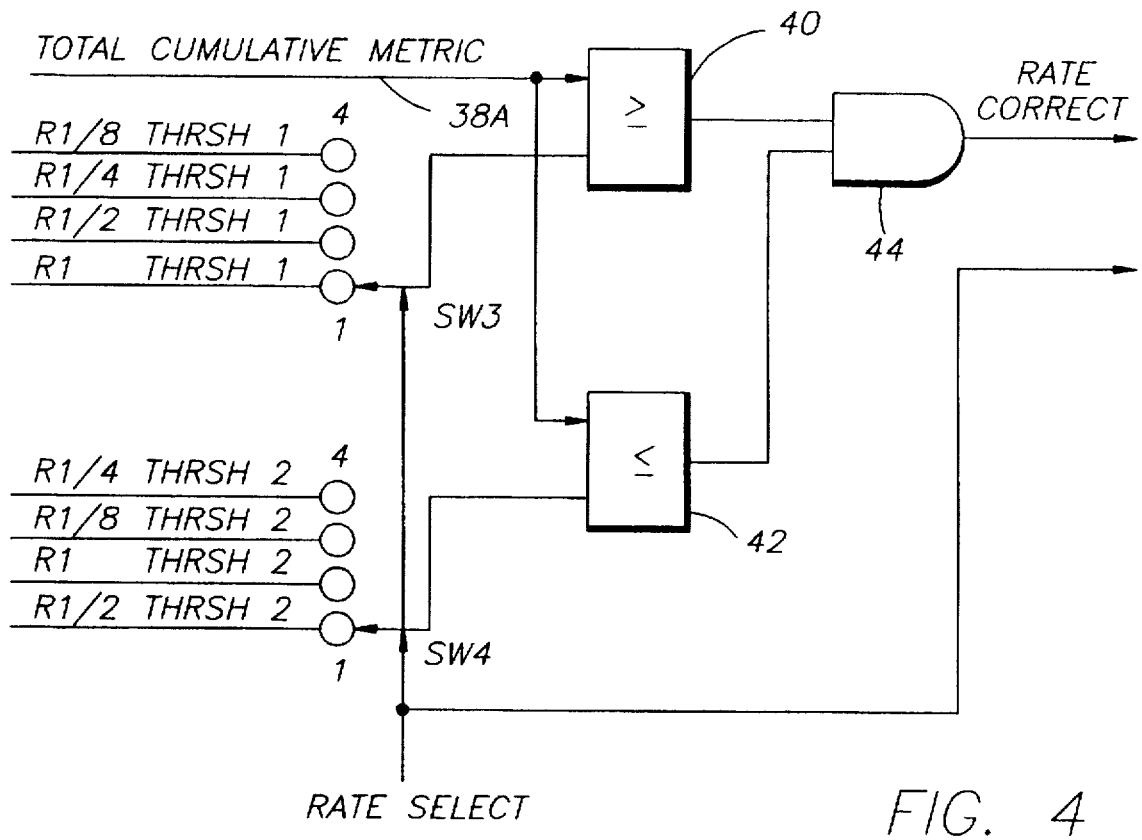
FIG. 4 is block diagram of an embodiment of circuitry for selecting a rate in accordance with a total Cumulative Metric and fixed rate thresholds.
Figure 6:
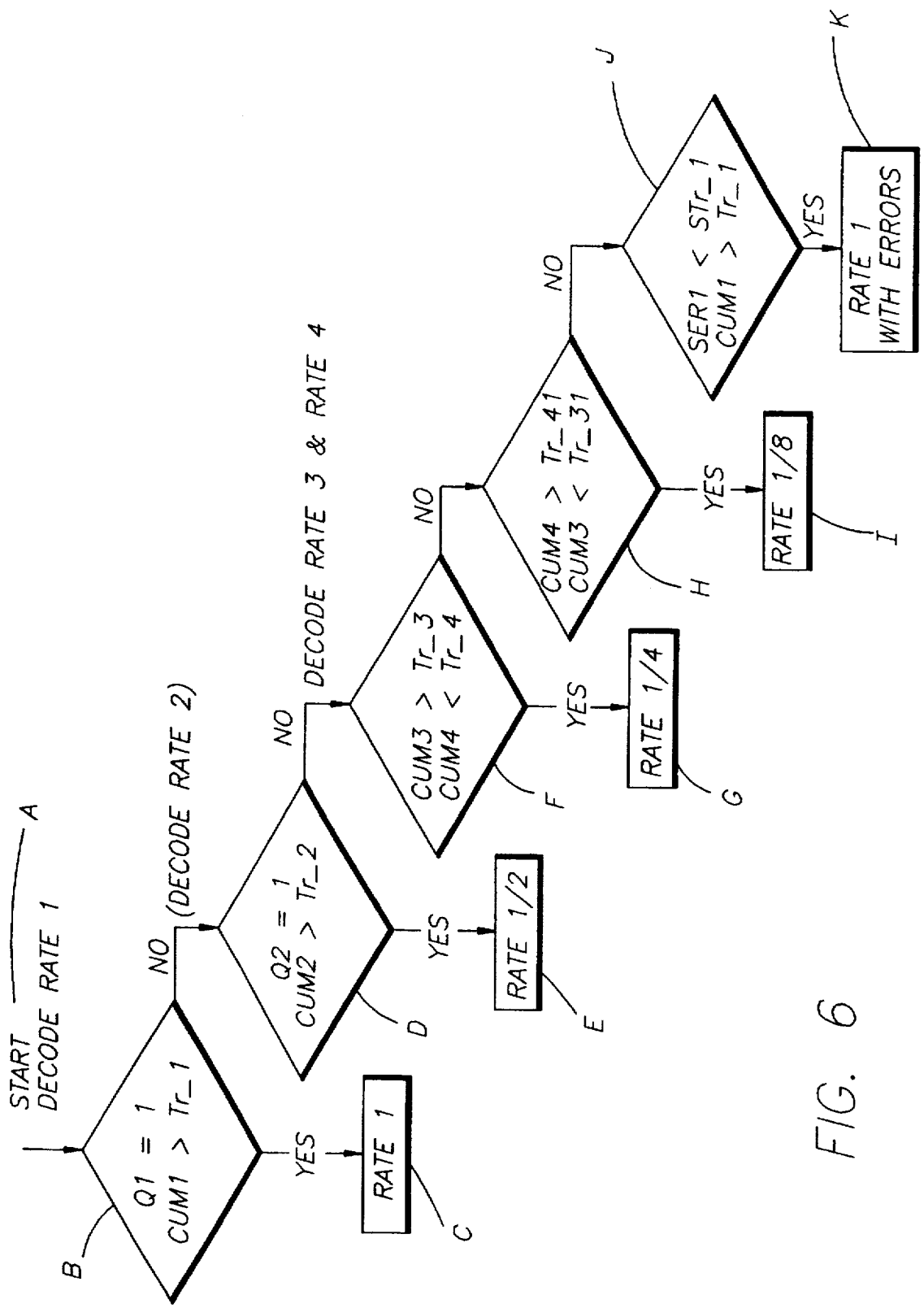
FIG. 6 is logic flow diagram of a rate selection method using fixed rate thresholds in accordance with an aspect of this invention.

In the embodiment of FIG. 4, and as is also illustrated in FIG. 6, the empirically defined thresholds (Thrsh) are compared in blocks 40 and 42, in conjunction with the operation of logical switches SW3 and SW4 and AND gate 44, with the value of the Cumulative Metric of the ML path added to the Total Normalization value (i.e., the output 38a of the summation block 38 of FIG. 3). If the value of the signal 38a is greater than the currently selected rate threshold and less than thresholds for other data rates (the output of AND 44 is true), the selected rate will be indicated as being the correct rate.

It is noted that the switches SW3 and SW4 are arranged so as to each have four inputs. The rate thresholds are applied to these inputs such that as the switch moveable contacts move in tandem from the lowest position (position 1) to the highest position (position 4), the thresholds are applied to the comparators 40 and 42 as follows.

| ≧ Comparator 40 | ≦ Comparator 42 |
| --- | --- |
| R1 | R1/2 |
| R1/2 | R1 |
| R1/4 | R1/8 |
| R1/8 | R1/4 |

By example, and assuming that the switches SW3 and SW4 are in position 4, if the value of Total Cumulative Metric signal 38a is greater than the R⅛ threshold value, and less than the R¼ threshold value, the outputs of both comparators 40 and 42 will be true, resulting in the output of AND gate 44 being true, thus indicating that the received rate is R⅛.

Figure 5:
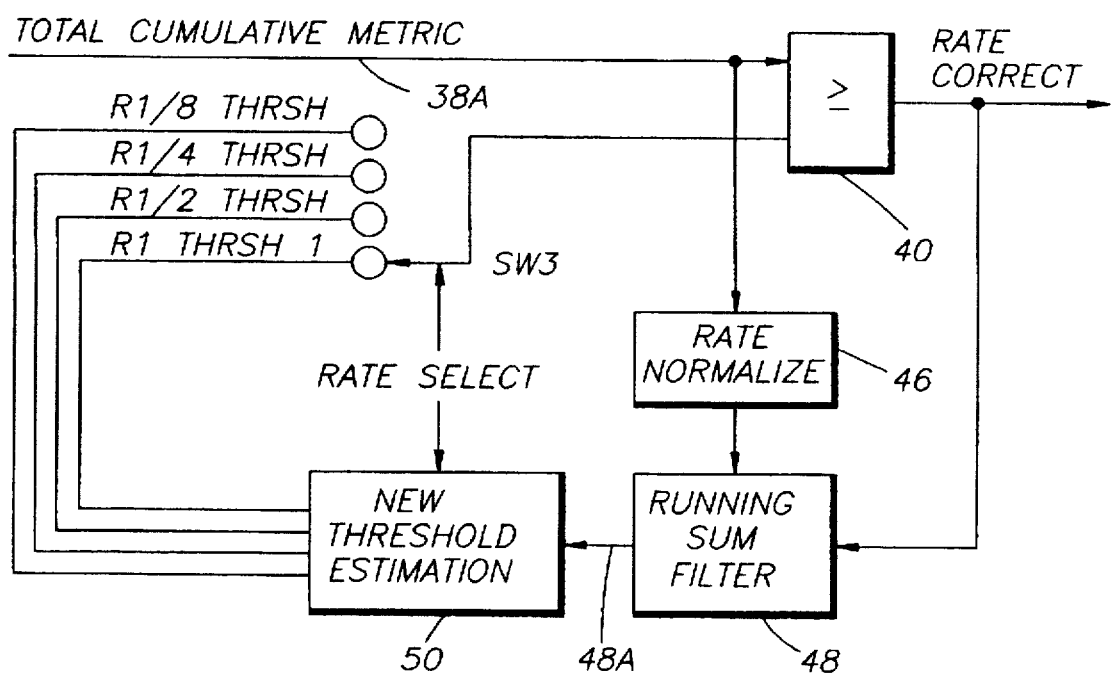
FIG. 5 is block diagram of a first embodiment of circuitry for selecting a rate in accordance with a total Cumulative Metric and adaptive rate thresholds.

Referring to FIG. 6, and in accordance with a method of this invention, the process starts at block A by decoding a received frame at Rate 1. A comparison is then made at block B to determine if the Total Cumulative Metric exceeds the fixed threshold (Tr__1) for Rate 1. If yes, control passes to block C where the frame is determined to have been received with Rate 1. Further decoding of the received frame is thus not necessary. If no at block B, control pass to block D with a preliminary step of decoding the frame at Rate 2. If the Total Cumulative Metric exceeds the fixed threshold for Rate 2, control passes to block E where the frame is declared to have been received at Rate ½. If no at block D, control passes to block F with a preliminary step of decoding the frame at Rates 3 and 4. If the Total Cumulative Metric for the Rate 3 decoding exceeds the Rate 3 threshold, and if the Total Cumulative Metric for the Rate 4 decoding is less than the Rate 4 threshold, control passes to block G where the frame is declared to have been received at Rate ¼. If no at block F, control passes to block H where a comparison is made to determine if the Total Cumulative Metric for the Rate 4 decoding exceeds the fixed Rate 4 threshold and that the Total Cumulative Metric from the Rate 3 decoding is less than the fixed Rate 3 threshold. If yes, control passes to block I and the frame is declared to have been received at Rate ⅛. If no at block H, control passes to block J where a comparison is made to determine if the SER at Rate 1 is less than a predetermined SER threshold for Rate 1, and that the Total Cumulative Metric for the Rate 1 decoding exceeds the fixed Rate 1 threshold. If yes, control passes to block K where the frame is declared to have been received, with errors, at Rate 1. If no at block J, the frame can be discarded. The FDTRD method FIG. 5 illustrates a block diagram of circuitry for a first embodiment of the adaptive decision thresholds rate determination method of this invention. In addition to the knowledge of the Cumulative Metric 36a for the ML path and the associated accumulated normalization value 34a, and in view of the incoherent addition of the repeated channel symbols prior to the Branch Metric calculation unit 28 (for all rates other than the transmitted rate), this embodiment also takes advantage of the knowledge of the rate dependent dynamics of the Cumulative Metric to define an adaptive, to the changing SNR, set of rate determination thresholds.

In general, the relationship of the Cumulative Metric value to the data rate is that of $1/\sqrt{2}$ between consecutive rates of 1, ½, ¼, and ⅛. It is also known that the incoherent addition of the channel symbols for non-matching (transmitted vs. decoded) rates reduces the value of the Cumulative Metric by $1/\sqrt{2}$. In other words, the value of the Cumulative Metric for a Rate 1 frame, when the frame is decoded at Rate ½, is decreased by $1/\sqrt{2}$ relative to the value of the Cumulative Metric for the same frame when decoded at Rate 1. Similar differences exist for all of the other rates, and thus enable a calculation of the rate determination thresholds. However, the size of the Cumulative Metric varies with the channel SNR. As such, and in order to establish an optimal set of rate determination thresholds, a knowledge of the current $E_b/N_o$ ratio (SNR) of the channel is required.

The $E_b/N_o$ for the current frame can be estimated indirectly by the Viterbi decoder 14 rate determination circuitry by monitoring the value of the Total Cumulative Metric for the previous frames. The value of the Total Cumulative Metric of a correctly decoded frame is normalized in block 46 to the Rate 1 by multiplying its value by $2\sqrt{2}$, $4\sqrt{2}$, or by $8\sqrt{2}$ for rate ½, ¼, and ⅛ respectively, and then filtered over several frames in a running sum filter 48 to remove any variance due to changes in the channel profile. The output 48a of the running sum filter 48 is applied to a threshold estimation block 50, which outputs adaptively determined rate thresholds to the input contacts of the switch SW3. The output of SW3 is applied to the comparator 40, in conjunction with the Total Cumulative Metric 38a, as described in FIG. 4. The output of the comparator 40 in this case directly indicates the correct rate.

FIG. 8 illustrates a block diagram of circuitry for a second embodiment of the adaptive decision thresholds rate determination method of this invention. Reference should also be made to the logic flow diagram of FIGS. 9A and 9B. It is noted that, in practice, the running sum filter 48 of FIG. 5 can operate in the same or essentially the same fashion as the moving average filter 52 of FIG. 8.

The average reference threshold for the full (R1), and the thresholds for half (R½), quarter (R¼), and eighth (R⅛) rates are preferably determined from the moving averaging filter 52 as follows:

$$R1\_CUM_{ref} = \frac{\sum_{}^{M} R1\_CUM}{M}$$

The new rate thresholds are then calculated in block 50 as:

$$R1\_Tr = R1\_CUM_{ref} \times c1;$$

$$R\frac{1}{2}\_Tr = R1\_Tr/c2;$$

$$R\frac{1}{4}\_Tr = R1\_Tr/c3; \text{ and}$$

$$R\frac{1}{8}\_Tr = R1\_Tr/c4;$$

where CUM is the Cumulative Metric, and c1, c2, c3 and c4 are constants having suitable values of, by example, approximately 0.9, 2.8, 7.8 and 22, respectively. It is also within the scope of the invention to calculate:

$$R1\_Tr\_Err = R1\_CUM_{ref}/c5;$$

where a suitable value for c5 is 1.4. R1_Tr_Err can be employed in block P of FIG. 9B as a Rate 1 error threshold value.

Figure 9A:
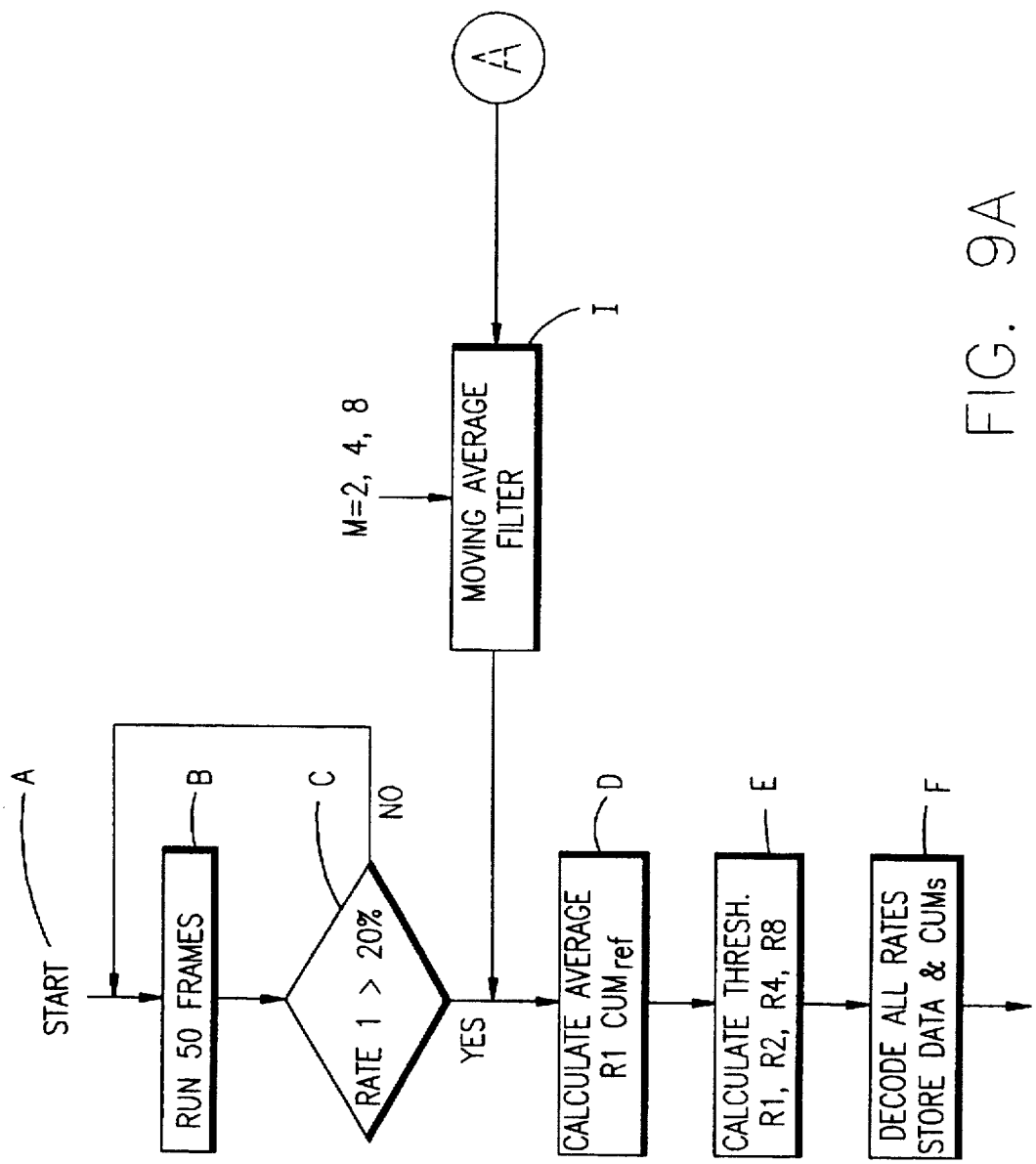
FIGS. 9A and 9B are logic flow diagram of a rate selection method using adaptive rate thresholds in accordance with a further aspect of this invention.
Figure 9B:
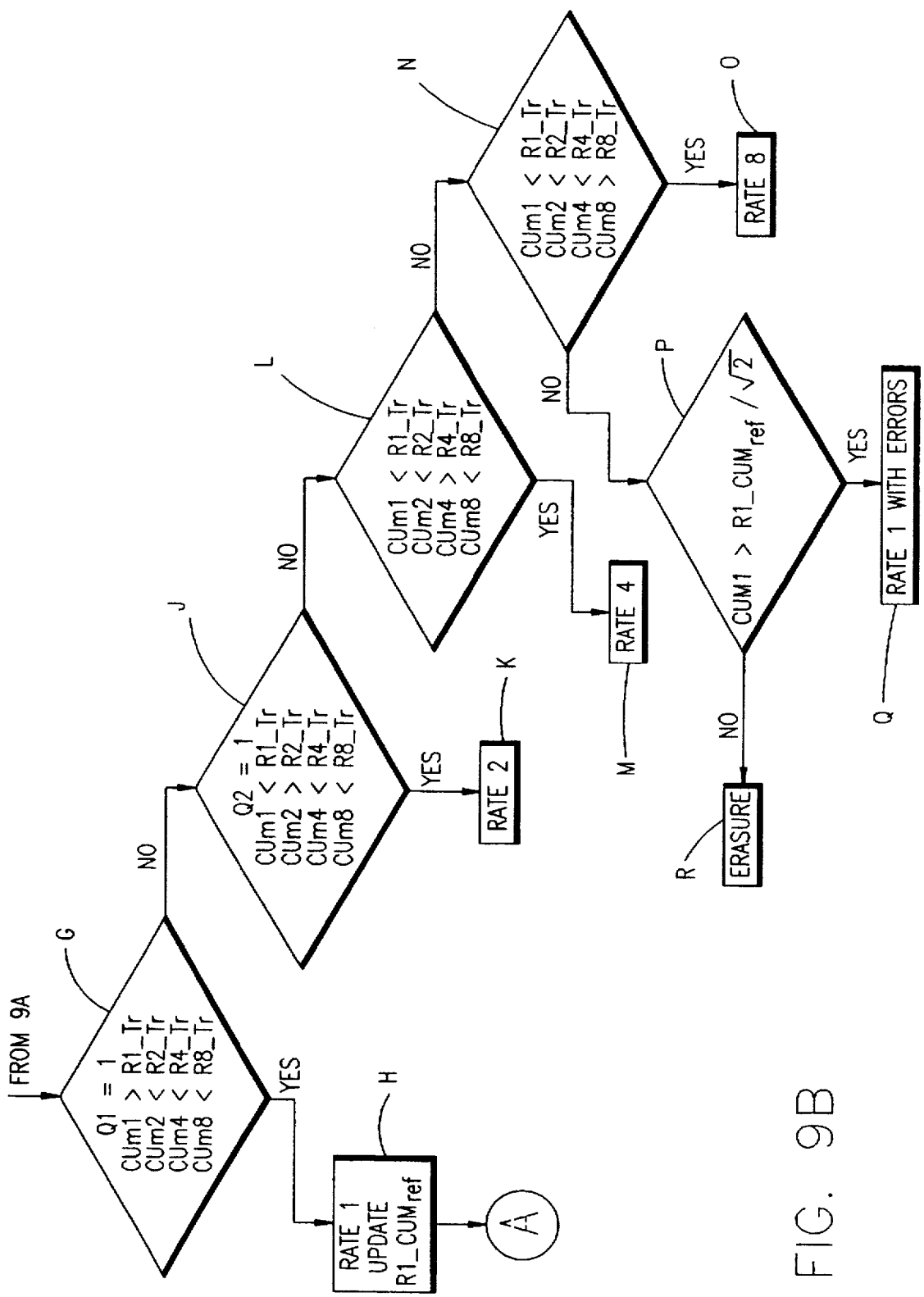
Figure 9C:
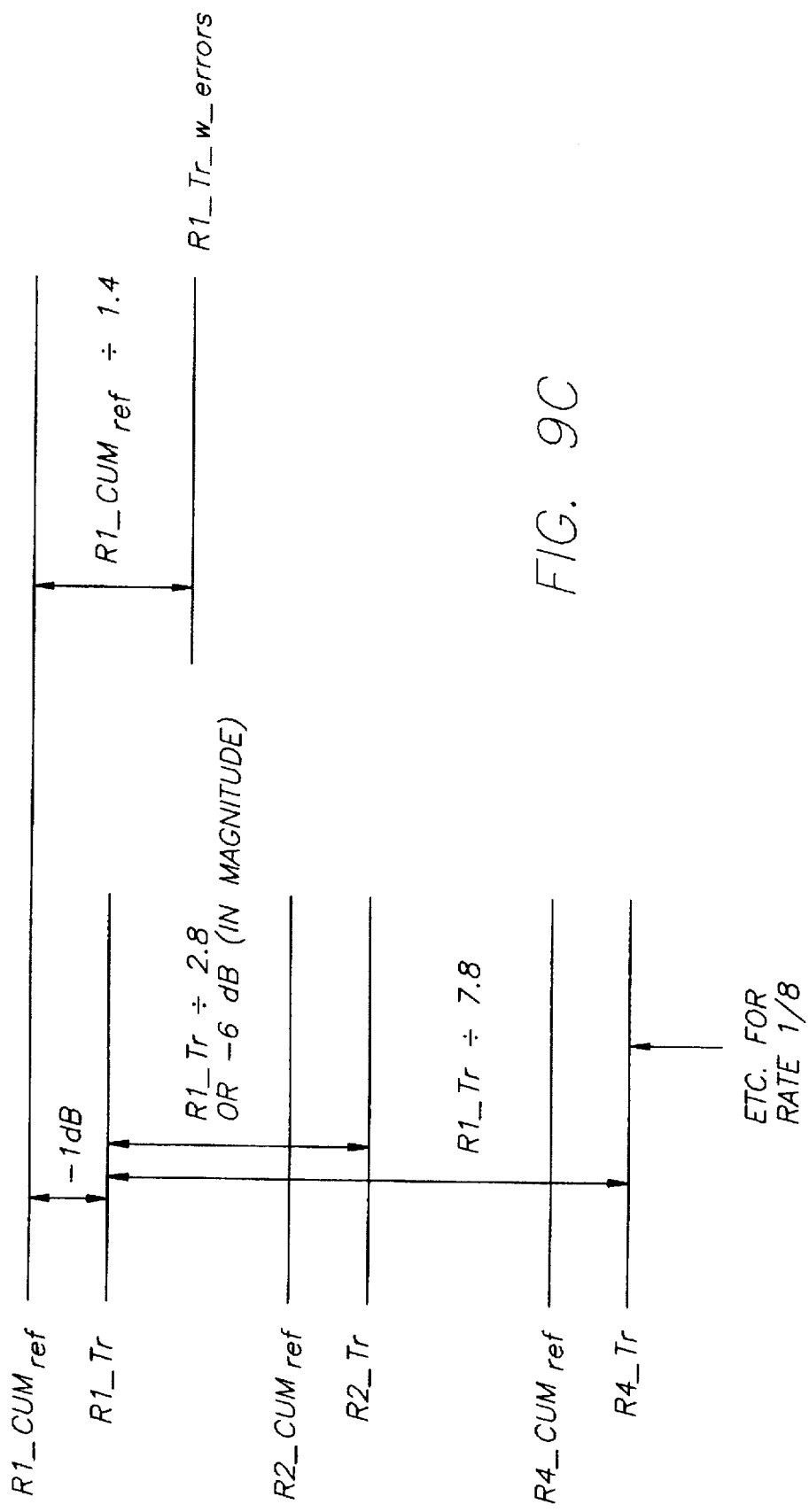
FIG. 9C is a diagram that facilitates an understanding of the adaptive thresholds calculation of FIG. 9A.

Referring to FIGS. 9A and 9B, at block A the method starts and at block B some number of frames, for example 50, are received and decoded. At block C, a determination is made if more than, by example, 20% of these 50 frames are Rate 1 frames. If no, the method loops back to step B to accumulate another 50 frames. This initial determination can be made using the Fixed Threshold technique described above, and is employed so as to obtain an adequate sample of the Rate 1 Total Cumulative Metric. If yes at block C, control passes to block D where an average of the Rate 1 Total Cumulative Metrics is determined ($R1\ CUM_{ref}$). Control passes then to block E to calculate the Rate 1, Rate ½, Rate ¼ and Rate ⅛ thresholds as was described above. Reference in this regard can also be had to FIG. 9C. At block F a received frame is decoded at all rates and the decoded data and Total Cumulative Metrics are stored. At block G a determination is made if the Total Cumulative Metric for Rate 1 is greater than the Rate 1 threshold, and if the Rate ½–⅛ Total Cumulative Metrics are less than their respective thresholds as calculated in block E. If yes, control passes to block H where the received frame is determined to be a Rate 1 frame, and the Rate 1 Total Cumulative Metric reference is updated. Control then passes to block I to update the moving average filter 52, and then back through blocks D, E and F to update the calculated thresholds. If no at block G, control passes to block J. At block J a determination is made if the Total Cumulative Metric for Rate ½ is greater than the Calculated Rate ½ threshold, and if the Rate 1, Rate ¼, and Rate ⅛ Total Cumulative Metrics are all less than their respective calculated thresholds. If yes, control passes to block K where the received frame is declared to have been received at Rate ½. If no at block J, control passes to block L. At block L a determination is made if the Total Cumulative Metric for Rate ¼ is greater than the Calculated Rate ¼ threshold, and if the Rate 1, Rate ½, and Rate ⅛ Total Cumulative Metrics are all less than their respective calculated thresholds. If yes, control passes to block M where the received frame is declared to have been received at Rate ¼. If no at block L, control passes to block N. At block N a determination is made if the Total Cumulative Metric for Rate ⅛ is greater than the Calculated Rate ⅛ threshold, and if the Rate 1, Rate ½, and Rate ¼ Total Cumulative Metrics are all less than their respective calculated thresholds. If yes, control passes to block O where the received frame is declared to have been received at Rate ⅛. If no at block N, control passes to block P where a determination is made if the Total Cumulative Metric for Rate 1 is greater than the Rate 1 Cumulative Metric Reference divided by the square root of 2. If yes, control passes to block Q where the frame is declared to have been received at Rate 1 but with errors. If no at block P, control passes to block R where the frame is erased.

It should be realized that the logic flow diagrams of FIGS. 6 and 9A can also be viewed as block diagrams of circuitry for processing received signals in accordance with the methods of this invention.

Referring to FIG. 11, there is illustrated a spread spectrum radiotelephone 60 that operates in accordance with the rate determination methods and apparatus of this invention. Certain ones of the blocks of the radiotelephone 60 may be implemented with discrete circuit elements, or as software routines that are executed by a suitable digital data processor, such as a high speed signal processor. Alternatively, a combination of circuit elements and software routines can be employed. As such, the ensuing description is not intended to limit the application of this invention to any one particular technical embodiment.

In the preferred embodiment of this invention the spread spectrum radiotelephone 60 operates in accordance with the TIA/EIA Interim Standard, Mobile Station-Base Station Compatibility Standard for Dual-Mode Wideband Spread Spectrum Cellular System, TIA/EIA/IS-95 (July 1993). However, compatibility with this particular interim standard is not to be considered a limitation upon the practice of this invention.

The radiotelephone 60 includes an antenna 62 for receiving RF signals from a cell site, hereafter referred to as a base station (not shown), and for transmitting RF signals to the base station. When operating in the digital (spread spectrum or CDMA) mode the RF signals are phase modulated to convey speech and signalling information. Coupled to the antenna 62 are a gain controlled receiver 64 and a gain controlled transmitter 66 for receiving and for transmitting, respectively, the phase modulated RF signals. A frequency synthesizer 68 provides the required frequencies to the receiver and transmitter under the control of a controller 70. The controller 70 is comprised of a slower speed MCU for interfacing, via a codec 72, to a speaker 72A and a microphone 72B, and also to a keyboard and a display 74. In general, the MCU is responsible for the overall control and operation of the radiotelephone 60. The controller 70 is also preferably comprised of a higher speed digital signal processor (DSP) suitable for real-time processing of received and transmitted signals.

The received RF signals are converted to baseband in the receiver and are applied to a phase demodulator 76 which derives in-phase (I) and quadrature (Q) signals from the received signal. The I and Q signals are converted to digital representations by suitable A/D converters and applied to a multiple finger (e.g., three fingers F1–F3) demodulator 78, each of which includes a local PN generator. The output of the demodulator 78 is applied to a combiner 80 which outputs a signal, via the deinterleaver and decoder 14 of this invention, to the controller 70. The digital signal input to the controller 70 is expressive of speech samples or signalling information and, in accordance with the teaching of this invention, the rate at which a frame of data was received.

An input to the transmitter 66 (vocoded speech and/or signalling information) is derived from the controller 70 via a convolutional encoder, interleaver, Walsh modulator, PN modulator, and I-Q modulator, which are shown collectively as the block 82.

It should be noted that the rate determination techniques described above can also be performed using the SER 16a and the normalized Cumulative Metric, either alone or in combination with the CRC 14d. As such, these inputs are also shown as being (optionally) applied to the rate determination block 18 of FIG. 1.

Additionally, those systems which can afford the added complexity and expense of storing a non-normalized Cumulative Metric can take the advantage of the non-coherent addition of repeated channel symbols for the branch metric calculation. In this case the non-normalized Cumulative Metric can be employed to determine the transmitted data rate. That is, the same benefits can be achieved when the Viterbi decoder Cumulative Metrics are stored without normalization, while avoiding clipping. This, however, requires significantly more memory, wherein the size of the Cumulative Metric memory 36a is proportional to the dynamic range of the soft data multiplied by the length of the data frame.

Clearly, the invention disclosed herein has as one advantage a determination of reliable rate information with a minimum memory cost.

Although described above in the context of a system and methods that add the output 34a of the normalize value accumulator 34 to the Cumulative Metric 36a for the ML path, it is also within the scope of this invention to perform the rate determination using only the output 34a of the State 0 normalize value accumulator 34. In this case the fixed or adaptive thresholds are determined based on the accumulated State 0 normalize value 34a, and this value is used (as opposed to the Total Cumulative Metric value 38a) when comparing the result of decoding a frame to the threshold values. For the full rate case the normalize value 34a is used as is, while for the ½, ¼, and ⅛ rates the normalize value is preferably first scaled by, for example, two.

Thus, while the invention has been particularly shown and described with respect to preferred embodiments thereof, it will be understood by those skilled in the art that changes in form and details may be made therein without departing from the scope and spirit of the invention.

What is claimed is:

1. A method for determining a data rate of a received encoded signal, comprising the steps of:

decoding a signal received from a communications channel to extract data therefrom, the data being received at one of a plurality of rates;

while decoding the signal at one of the plurality of rates, accumulating a normalization value of Cumulative Metrics;

using the accumulated normalization value to reconstruct a Total Cumulative Metric for at least a Most Likely decoder path;

comparing the Total Cumulative Metric to at least one threshold value corresponding to at least one of said plurality of rates; and based on the comparison, identifying a rate at which the data was received from the communications channel.

2. A method as set forth in claim 1, wherein the plurality of threshold values are fixed values.

3. A method as set forth in claim 1, wherein the plurality of threshold values are varied as a function of at least one reception-related criterion.

4. A method as set forth in claim 1, wherein the step of decoding includes a step of summing and scaling received data bits as a function of data rate.

5. A method as set forth in claim 4, wherein the step of summing includes a step of coherently combining only data bits received at the transmitted data rate.

6. A method for determining a data rate of a received encoded signal, comprising the steps of:

decoding the received signal and determining, for individual ones of n data rates, a value of a total cumulative metric associated with a most likely path through a decoder trellis;

comparing the value of the total cumulative metric to a plurality of total cumulative metric threshold values, individual ones of the plurality of total cumulative metric threshold values corresponding to an expected total cumulative metric for an individual one of the n data rates; and identifying the received data rate based on the comparison.

7. A method as set forth in claim 6, wherein the step of decoding includes a step of determining branch metrics of received symbols, and wherein the step of determining branch metrics includes an initial step of scaling received data in accordance with individual ones of the n data rates.

8. A method as set forth in claim 6, wherein the step of determining a total cumulative metric includes the steps of:

processing the branch metrics to determine survivor metrics;

normalizing individual ones of the survivor metrics to form normalized survivor metrics;

accumulating the normalized survivor metrics to form cumulative metrics;

accumulating normalization values used to normalize each of the normalized survivor metrics;

at the end of decoding, outputting a cumulative metric that corresponds to a most likely path through the trellis; and combining an accumulated normalization value with the outputted cumulative metric to form the total cumulative metric.

9. A method as set forth in claim 6, wherein the step of decoding includes a step of determining branch metrics of received symbols, and wherein the step of determining branch metrics includes an initial step of linearly scaling received data in accordance with individual ones of the n data rates.

10. A method as set forth in claim 6, wherein the step of decoding includes a step of determining branch metrics of received symbols, and wherein the step of determining branch metrics includes an initial step of non-linearly scaling received data in accordance with individual ones of the n data rates.

11. A method as set forth in claim 6, wherein the step of comparing uses predetermined, fixed cumulative metric threshold values.

12. A method as set forth in claim 6, wherein the step of comparing includes a step varying the plurality of cumulative metric threshold values.

13. A method as set forth in claim 6, wherein the data is received during a given frame of data at one of a highest rate and at least one lower rate, and wherein the step of comparing includes the steps of:

performing an initial step of determining a value of an average cumulative metric for data received at the highest rate;

calculating from the determined value a cumulative metric threshold value for each of the highest rate and the at least one lower rate; and for each subsequent frame that is determined to be received at the highest rate, revising the value of the average cumulative metric; and calculating from the revised value a revised cumulative metric threshold value for each of the highest rate and the at least one lower rate.

14. Apparatus for determining a data rate of a received encoded signal, comprising:

a decoder for decoding a signal received from a communications channel for extracting data therefrom, the data being received at one of a plurality of rates, said decoder comprising an accumulator for accumulating a normalization value of Cumulative Metrics;

means for combining an accumulated normalization value with a Cumulative Metric to reconstruct a Total Cumulative Metric for at least a Most Likely decoder path;

a comparator for comparing the Total Cumulative Metric to at least one threshold value corresponding to at least one of said plurality of rates; and means, responsive to said comparator, for identifying a rate at which the data was received from the communications channel.

15. Apparatus as set forth in claim 14, wherein the plurality of threshold values are fixed values.

16. Apparatus as set forth in claim 14, wherein the plurality of threshold values are varied as a function of at least one reception-related criterion.

17. Apparatus as set forth in claim 14, wherein said decoder further comprises means for summing and scaling received data bits as a function of data rate.

18. Apparatus as set forth in claim 17, wherein said means for summing and scaling coherently combines only data bits received at the transmitted data rate.

19. Apparatus for determining a data rate of a received encoded signal, comprising:

means for decoding the received signal and for determining, for individual ones of n data rates, a value of a total cumulative metric associated with a most likely path through a decoder trellis, the total cumulative metric being determined from a summation of a cumulative metric and an accumulated normalization value for the cumulative metric;

means for comparing the value of the total cumulative metric to a plurality of predetermined and fixed cumulative metric threshold values individual ones of which correspond to an expected total cumulative metric for an individual one of the n data rates; and means for identifying the received data rate based on the comparison.

20. Apparatus for determining a data rate of a received encoded signal, comprising:

means for decoding the received signal and for determining, for individual ones of n data rates, a value of a total cumulative metric associated with a most likely path through a decoder trellis;

means for comparing the value of the total cumulative metric to a plurality of cumulative metric threshold values individual ones of which correspond to an expected total cumulative metric for an individual one of the n data rates; and means for identifying the received data rate based on the comparison, wherein said means for decoding comprises means for determining branch metrics of received symbols, and means for scaling received data in accordance with individual ones of the n data rates prior to an application of the received data to the means for determining branch metrics, and wherein said scaling means is comprised of means for non-linearly scaling received data in accordance with individual ones of the n data rates.

21. Apparatus for determining a data rate of a received encoded signal, comprising:

means for decoding the received signal and for determining, for individual ones of n data rates, a value of a total cumulative metric associated with a most likely path through a decoder trellis;

means for comparing the value of the total cumulative metric to a plurality of cumulative metric threshold values individual ones of which correspond to an expected total cumulative metric for an individual one of the n data rates; and means for identifying the received data rate based on the comparison, wherein said means for determining a total cumulative metric is comprised of:

means for processing the branch metrics to determine survivor metrics;

means for normalizing individual ones of the survivor metrics to form normalized metrics;

means for accumulating the normalized metrics to form cumulative metrics;

means for accumulating normalization values used to normalize each of the normalized metrics;

means, responsive to a termination of decoding, for outputting a cumulative metric that corresponds to a most likely path through the trellis; and means for adding an accumulated normalization value to the outputted cumulative metric to form the total cumulative metric.

22. Apparatus as set forth in claim 21, wherein said means for decoding comprises means for determining branch metrics of received symbols, and means for scaling received data in accordance with individual ones of the n data rates prior to an application of the received data to the means for determining branch metrics.

23. Apparatus as set forth in claim 22, wherein said scaling means is comprised of means for linearly scaling received data in accordance with individual ones of the n data rates.

24. Apparatus as set forth in claim 21, wherein said comparing means uses predetermined, fixed cumulative metric threshold values.

25. Apparatus as set forth in claim 19, wherein said comparing means is comprised of means for varying the plurality of cumulative metric threshold values.

26. Apparatus for determining a data rate of a received encoded signal, comprising:

means for decoding the received signal and for determining, for individual ones of n data rates, a value of a total cumulative metric associated with a most likely path through a decoder trellis;

means for comparing the value of the total cumulative metric to a plurality of cumulative metric threshold values individual ones of which correspond to an expected total cumulative metric for an individual one of the n data rates; and means for identifying the received data rate based on the comparison, wherein the data is received during a given frame of data at one of a highest rate and at least one lower rate, and wherein said comparing means is comprised of:

means for determining a value of an average cumulative metric for data received at the highest rate;

means for calculating from the determined value a cumulative metric threshold value for each of the highest rate and the at least one lower rate;

means, responsive to each subsequent frame that is determined to be received at the highest rate, for revising the value of the average cumulative metric for data received at the highest rate; and means for calculating from the revised value a revised cumulative metric threshold value for each of the highest rate and the at least one lower rate.

27. A user terminal for receiving an RF signal that conveys a spread spectrum, code division, multiple access user communication, the user communication being transmitted in frames of data bits, individual ones of the frames being transmitted with a data rate selected from a set of n data rates that includes a highest rate and at least one lower rate, said user terminal comprising means for de-spreading a received user communication to provide a received signal and further comprising:

means for decoding the received signal and for determining, for individual ones of n data rates, a value of a total cumulative metric associated with a most likely path through a decoder trellis, said decoding means comprising means for determining branch metrics of received data, and means for at least one linearly scaling and non-linearly scaling received data in accordance with individual ones of the n data rates prior to an application of the received data to the means for determining branch metrics, said decoding means further comprising means for processing the branch metrics to determine survivor metrics;

means for normalizing individual ones of the survivor metrics to form normalized metrics; means for accumulating the normalized metrics to form cumulative metrics; means for accumulating normalization values used to normalize each of the normalized metrics;

means, responsive to a termination of decoding, for outputting a cumulative metric that corresponds to a most likely path through the trellis; and means for adding an accumulate normalization value to the outputted cumulative metric to form the total cumulative metric;

means for comparing the value of the total cumulative metric to a plurality of adaptively determined cumulative metric threshold values individual ones of which correspond to an expected total cumulative metric for an individual one of the n data rates; and means for identifying the received data rate based on the comparison.

28. A user terminal as set forth in claim 27, wherein said comparing means is comprised of:

means for determining a value of an average cumulative metric for data received at the highest rate;

means for calculating from the determined value a cumulative metric threshold value for each of the highest rate and the at least one lower rate;

means, responsive to each subsequent frame that is determined to be received at the highest rate, for revising the value of the average cumulative metric for data received at the highest rate; and means for calculating from the revised value a revised cumulative metric threshold value for each of the highest rate and the at least one lower rate.

29. A method for determining a data rate of a received encoded signal, comprising the steps of:

decoding a signal received from a communications channel to extract data therefrom, the data being received at one of a plurality of rates;

while decoding the signal at one of the plurality of rates, accumulating a normalization value of Cumulative Metrics;

comparing one of the accumulated normalization value and a scaled version of the accumulated normalization value to at least one predetermined, fixed threshold value corresponding to at least one of said plurality of rates; and based on the comparison, identifying a rate at which the data was received from the communications channel.

30. A method as set forth in claim 29, wherein the step of decoding includes a step of summing and scaling received data bits as a function of data rate.

31. A method as set forth in claim 30, wherein the step of summing includes a step of coherently combining only data bits received at the transmitted data rate.

32. A method for use in a radiotelephone adapted for receiving a variable data rate Code Division Multiple Access signal from a communications channel, comprising the steps of:

receiving and despreading the signal to form a received signal;

accumulating and one of linearly scaling and non-linearly scaling received data in accordance with individual ones of n data rates;

determining branch metrics from the scaled received data;

using the determined branch metrics for decoding the received data and determining, for individual ones of the n data rates, a value of a normalized cumulative metric associated with a most-likely path through a decoder trellis and a value of an associated cumulative metric normalization value;

comparing a decoder output value, that includes the value of the associated cumulative metric normalization value, to a plurality of threshold values, individual ones of the plurality of threshold values having a value that is a function of a result of a coherent combination of the received data, for an individual one of the n data rates, during the step of accumulating and scaling; and identifying a received data rate based on the comparison.

33. A method as set forth in claim 32, wherein the plurality of threshold values are adaptively determined as a function of at least one characteristic of the communication channel.

34. A method as set forth in claim 32, wherein there are at least four data rates R designated R1, R½, R¼, and R⅛ and at least four corresponding threshold values R1_Tr, R½_Tr, R¼_Tr, and R⅛_Tr, respectively, and wherein values of the corresponding threshold values are determined in accordance with the expressions:

$$R1\_Tr = R1\_CUM_{ref} \times c1;$$

$$R\tfrac{1}{2}\_Tr = R1\_Tr/c2;$$

$$R\tfrac{1}{4}\_Tr = R1\_Tr/c3; \text{ and}$$

$$R\tfrac{1}{8}\_Tr = R1\_Tr/c4;$$

wherein $CUM_{ref}$ has a value that is a function of a value of a cumulative metric of the most-likely path, and c1, c2, c3 and c4 are constants having values of approximately 0.9, 2.8, 7.8 and 22, respectively.

* * * * *